United States Patent [19]
Pink et al.

[11] Patent Number: 5,531,537
[45] Date of Patent: Jul. 2, 1996

[54] CYLINDRICAL KEY AND SLOT COUPLING

[75] Inventors: Edward N. Pink, Westlake Village; Michael F. Johnson, Palmdale, both of Calif.

[73] Assignee: Edelbrock Corporation, Torrance, Calif.

[21] Appl. No.: 274,396

[22] Filed: Jul. 12, 1994

[51] Int. Cl.$^6$ .................................................. B25G 3/28
[52] U.S. Cl. ........................ 403/356; 29/447; 418/206.9; 418/179
[58] Field of Search .................................. 403/355, 356; 29/447; 418/206.1, 206.9, 179

[56] References Cited

U.S. PATENT DOCUMENTS

| | | | |
|---|---|---|---|
| 1,291,388 | 1/1919 | Bright et al. | 29/447 |
| 1,448,925 | 3/1923 | Fulton et al. | 403/356 |
| 2,807,485 | 9/1957 | Seibert | 403/356 |
| 4,602,411 | 7/1986 | Brown | 29/447 X |
| 5,033,941 | 7/1991 | Jensen | 29/447 X |

*Primary Examiner*—Richard E. Gluck
*Attorney, Agent, or Firm*—Ronald M. Goldman

[57] ABSTRACT

A cylindrical pin couples a driven member, such as a rotor, to a driving shaft by means of axially and angularly aligned cylindrical grooves in the shaft and driven member defining a cylindrical cavity for receiving the pin. The pin fits in the defined cavity and radially bridges the space between the shaft and the driven member to link the two together. The shaft and pin are formed of a metal having a lower thermal coefficient of expansion characteristic than the metal forming the driven member. Torque, applied by the shaft, is applied to the rotor distributed over a portion of the cylindrical side walls of the pin.

6 Claims, 1 Drawing Sheet

CYLINDRICAL KEY AND SLOT COUPLING

FIELD OF THE INVENTION

The present invention relates to automobile oil pumps and other rotating mechanisms that contain rotating shafts and, more particularly, to an improved key and slot arrangement for coupling rotatable shafts to rotors, gears and the like and to its method of assembly.

BACKGROUND

Motors, engines, pumps and like rotary apparatus directly or indirectly use a rotating shaft as the driving member to turn rotors, gears, pulleys, cams and the like driven members. Unless formed integrally in one piece with the shaft, such driven members are locked to the shaft with a coupling, such as a key and slot arrangement. Such a coupling arrangement allows for replacement of gears, cams and other driven members linked to the rotatable shaft by simply removing the key and withdrawing the driven member. It also permits accurate alignment of one member relative to the other with substantially no looseness or play therebetween.

The key, an elongate rectangular member extends into a complementary rectangular shaped key way or slot located, respectively, on each of the shaft and driven member, bridges the two and thereby rigidly joins such parts together for joint rotation. Typically such keys are formed of hardened steel. In transmitting the rotational force or torque from the shaft to the member that force often is becomes concentrated at the top edge or corner of the key, as when the slot widens due to wear, and focuses stress on portions of the driven member.

The existence of right angled corners in the key ways does not result in abnormal stress on materials of great tensile strength and, in most instances, the normal operations do not create sufficient forces to stress those materials to the point of cracking at the corners. As example, the gears in gear trains are usually made of the same material as the key and the shaft so that the stresses of starting, accelerating and stopping do not place abnormal burdens on the coupling. However, in materials of relatively low tensile strength, the creation of stress cracks at the corners of the rectangular shaped key ways produced by a hard steel key can result in equipment failures even under normal operation.

In some rotating mechanisms the gear or rotor may be formed of a relatively softer or more malleable material than the driving shaft. The use of a rectangular steel key in a rectangular groove in that application could result eventually in cracking or fractures of the gear or rotor under the stresses from starting, accelerating and/or stopping of the shaft.

As example, modern high performance automobiles, such as those used in automobile racing, incorporate dry sump oil pump systems to provide engine lubrication under the extreme operating conditions encountered in automobile racing, such as the oil pump systems manufactured since the '70's by Cosworth Company of the United Kingdom. An oil pump system of that type, in addition to the principal oil pump, contains one, two, three or more scavenger pumps, the number being dependent upon performance needs, which scavenge oil from the engine and return it to the oil sump. Each scavenger pump employs a pair of rotors of a particular shape, referred to as the Roots rotors, arranged for counter rotational movement driven by a pair of steel shafts.

With so many rotors in such an oil pump system in order to keep the weight down and for ease of manufacturing to close tolerances, which are important considerations for racing automobiles, the pump rotors are formed of Aluminum, which is softer than steel. The pump's driving shafts, however, require greater strength and thus continue to be formed of steel, a tougher heavier metal than Aluminum. Hence the key coupling in that oil pump system must join members having such dissimilar physical characteristics, such as hardness, and still avoid creation of debilitating stresses on the rotor. The key coupling of the present invention as an advantage achieves that result.

Further, assembly of the foregoing oil pump requires accurate placement of the rotors between the side walls of the compartment associated with a particular scavenger pump. The shafts and rotors and the housing parts, such as the compartment walls and spacers separating those walls are machined to very tight tolerances. However, even with such tight manufacturing tolerances, slight misalignment between the compartment walls and the rotors could still result, whereby the flat end of a rotor rubs against the wall or may bind. One way to adjust that relationship is to allow the rotor to be axially adjustable in position on the shaft or "float" but such a feature is not believed to be compatible with the existing key coupling arrangement.

With the tight fit with which the rectangular key fits into the slot, the rotor cannot be adjusted with the key in place. If the key slot is designed to be wider so the key fits loose in the slot, instead of the customary tight fitting relationship, the force transmitted through the key becomes more focused at the upper edge of the key and increases stress on the softer aluminum rotor as could cause premature failure. The tight interconnection typically required with the rectangular key coupling between the shaft and the rotor thus is not the preferred or desired mode of operation in such an oil pump system and may not likely be preferred in other types of rotary devices as well. As an advantage, the improved key coupling of the present invention permits the rotor in such application to float.

Accordingly, an object of the present invention is to provide an improved means to couple a driving member and a driven member for joint rotation and to provide a novel method for producing such coupling.

Another object of the invention is to improve the manufacturing efficiency, reliability and effectiveness of a dry sump type automotive oil pump system, particularly those oil pump systems which incorporate rotors formed of light weight metal rotors, such as aluminum, and driving shafts formed of harder metals, such as steel.

A further object of invention to provide a novel coupling of driving and driven members formed of dissimilar materials having dissimilar tensile strengths that minimizes stress induced cracks or failures of such members.

An additional object of invention is to provide an improved key coupling system for coupling rotors formed of one material to a shaft of dissimilar material that avoids the use of sharp corners in the key.

It is a still additional object of the invention to provide a coupling for rotary apparatus that allows the driven member to float on the shaft.

SUMMARY OF THE INVENTION

According to the present invention, a key coupling is provided that uses a key or pin, as variously termed, that has smoothly curved outer walls, suitably being cylindrical in shape. The pin fits into a mating aperture, the slot, formed in complementary grooves in the shaft and the driven member, such as the rotor, and the pin bridges the two elements. The shaft and pin are formed of a metal having a lower thermal coefficient of expansion characteristic than the metal forming the driven member. Force exerted through the key to the driven member is distributed over a wider surface area, avoiding concentration at sharp corners as could occur with the prior rectangular key, thereby reducing stress on the driven member. As an additional feature to the invention, less than half of the aperture is formed by the groove in one member, suitably the shaft, and more than half of the aperture is formed by the groove in the other member, suitably the rotor.

In a more specific aspect to the invention, the rotor is mounted on the shaft by a passage in the rotor and the shaft diameter is of a size that provides a clearance fit within that passage, allowing slight play therebetween. Further, more than half of the aperture is formed by the groove in the rotor adjacent the aforedescribed passage, that is, the groove subtends an arc greater than one hundred and eighty degrees, so that the rotor groove thereby captures and retains the pin, allowing the pin to be held thereby in a radial position, raised slightly off of the bottom of the complementary groove formed in the shaft. This allows the rotor to float along the axis of the shaft for easy and automatic lateral adjustment.

To accomplish such coupling in accordance with the novel method of the invention, the rotor is mounted on the shaft and the pin is inserted into the shaft's groove. The rotor is pushed along the axis of the shaft to receive a portion of of the pin within the rotor's complementary groove until sufficient frictional resistance is encountered that precludes further movement. Thereupon, the temperature of the rotor is elevated expanding the rotor, and, while at the elevated temperature, the rotor is moved further along the shaft, slightly lifting the pin off the bottom of the complementary shaft groove, until the pin is fully ensleeved in the rotor.

The foregoing and additional objects and advantages of the invention together with the structure characteristic thereof, which was only briefly summarized in the foregoing passages, becomes more apparent to those skilled in the art upon reading the detailed description of a preferred embodiment, which follows in this specification, taken together with the illustration thereof presented in the accompanying drawings in which the preferred embodiment of the invention is illustrated by way of example; it being expressly understood that the drawings are for the purpose of illustration and description only, and are not intended as a definition of the limits to the invention.

DESCRIPTION OF THE PREFERRED EMBODIMENTS

Figure 1:
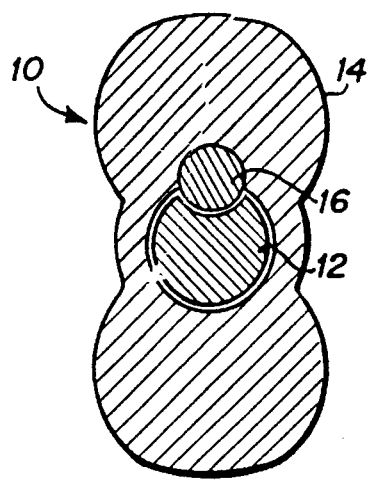
FIG. 1 is sectional view of an assembly of a shaft and rotating element according to the present invention.
Figure 2:
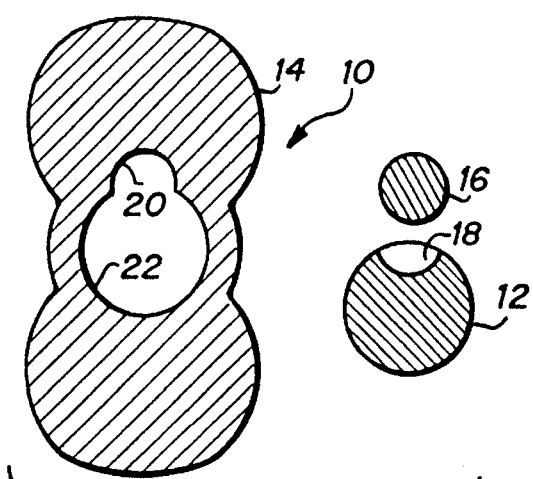
FIG. 2 is a sectional view of the individual elements of the embodiment of FIG. 1.

Turning first to FIG. 1, there is shown in cross section, an assembly 10 that includes a driving member or shaft 12, suitably of steel, that may be supported for rotation by one or two spaced shaft bearings, not illustrated; a driven member or rotor 14, suitably formed of aluminum, and a coupling pin 16, suitably a cylinder in geometry, and, like the shaft, formed of steel, that links the shaft and rotor together in accordance with the present invention. As coupled thereby the rotor turns responsive to rotation of the shaft about the shaft axis. For clarity of illustration, the clearance between shaft 12 and rotor 14 is slightly exaggerated, recognizing that there will be some physical contact therebetween, and the clearance between pin 16 and the shaft is exaggerated as well. To assist with the discussion hereafter those three elements are also illustrated separately in cross section in FIG. 2, which may be considered concurrently.

Shaft 12 contains a groove 18, referred to as the driving groove, recessed from the shaft's outer cylindrical surface and extending along the shaft in the axial direction. The groove contains flat ends and is a section of a cylinder. The cross section of the driving groove 18 is circular with the depth of the groove being less than r, where r is the radius of pin 16 and, as shown, the groove subtends a circular arc of less than 180 degrees. The length of the driving groove is slightly greater than the length of pin 16.

Rotor 14 contains a central cylindrical opening or passage 22 in which to receive shaft 12. The inner diameter of central passage 22 is slightly greater than the outer diameter of shaft 12, so as to produce a clearance fit, which permits some limited amount of play between rotor and shaft in the coupling. This is desirable principally to ease assembly. In the specific embodiment here described, the rotatable shaft and rotor are component elements of a dry sump type automobile oil pump. In this embodiment cylindrical passage 22 extends through the full width of the rotor so that the rotor may be oriented onto the shaft in either direction for ease of assembly.

Rotor 14 also contains a groove 20, referred to as the driven groove, of circular cross section located in the inside circumference or wall of passage 22 in the rotor, preferably formed along a vertical line of symmetry through the longest thickest portion of the rotor. The radially outward reach or depth of groove 20 is slightly greater than r, the diameter of pin 16, and groove 20 is seen to subtend a circular arc that is greater than 180 degrees.

Groove 20 extends through the rotor, from front to back, to permit pin 16 to enter the groove responsive to relative longitudinal movement of the pin and rotor in the direction of the shaft axis. With the rotor turned so that groove 20 is angularly aligned with groove 18 on the shaft, an aperture is defined, essentially cylindrical in shape, to provide a cavity or slot that essentially conforms to the shape of pin 16 and matingly engages that pin.

Figure 3:
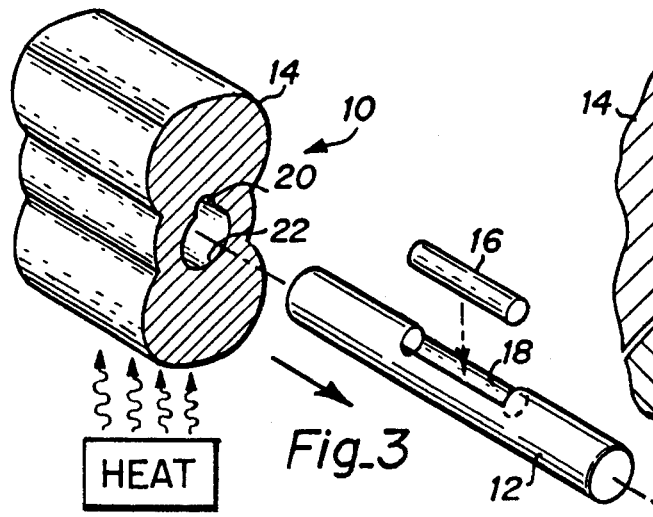
FIG. 3 is a perspective view illustrating the method of assembling the elements.

Turning next to FIG. 3, illustrating a portion of the shaft and other elements in perspective in an exploded view, to assemble rotor 14 on shaft 12, the shaft 12 is rotated so that groove 18 is on the top or up side. The rotor 14 is inserted onto the shaft 12 and is then moved along the shaft axis toward the pin, as indicated by the arrow. As the rotor approaches pin 16, it may be necessary to rotate the rotor 14 or shaft 12 relative to one another so that groove 18 and groove 20 are radially aligned. Pin 16 may then be inserted in the groove on the shaft. The rotor is then moved over and captures an initial portion of the pin within groove 20.

The pin contains circular end faces and the edges of those end faces are chamfered slightly to allow the pin to more easily enter the front end of groove 20 without manual intervention. As is appreciated, in other embodiments the edge of the rotor walls defining groove 20 may instead be chamfered or both the pin and the groove edge may be chamfered for the described purpose.

Since diameter of groove 20 is sized relative to the outer diameter of pin 16 as to result in a light press fit, a point is reached in the movement of the rotor at which the rotor, due to increased contact between the pin and rotor groove surfaces, encounters frictional resistance to further movement and cannot be moved further along the shaft by hand. At this stage, heat is applied to the rotor, raising its temperature and causing the rotor to expand slightly. With such expansion, while the temperature is elevated, the rotor now easily slides completely over the pin.

Since aluminum has a greater thermal expansion characteristic than steel, during heating, even though the other components may also be heated and expand somewhat, the expansion of the aluminum is greater than either that of the shaft and pin. And even though the force that moves the rotor along the shaft's axis may result in some drag force exerted by the wall of the groove on the pin, the flat end of the groove serves as a stop, preventing the pin from moving further along the shaft to any significant degree and/or out of groove 18.

It may be noted that hammering or pressing the rotor are obvious alternatives to heating for moving the rotor to seat the pin fully in groove 20. However that is less preferred since the use of such alternatives could cause damage to the rotor.

In this preferred embodiment, pin 16 has less than its radius in the driving groove 18, and pin 16 consequently is free to move outwardly in a radial direction and be received within the rotor's groove. As the rotor ensleeves pin 16 and captures the pin within driven groove 20, the side walls of the driven groove lifts the pin ever so slightly, from the bottom of the complementary driving groove 18, by perhaps one thousandths of an inch or less in the specific example considered. This lift distance is so small that it cannot usually be observed with the naked eye. As a consequence after the rotor has cooled to room temperature, one finds that pin 16 is firmly held in place in the rotor, while being loosely seated in the complementary groove in shaft 12. On completion, with pin 16 fully captured in the rotor groove, the pin, thus, is slightly raised from the bottom of the shaft groove. This produces a desirable play, observed by moving the components by hand, allowing the rotor to float axially on shaft 12. It is also found that the rotor can rotate very slightly relative to the shaft.

The aperture formed by the contiguous grooves 18 and 20 has been referred to a cylindrical or essentially cylindrical, the context of which is explored in greater detail before proceeding further. As a specific example, pin 16 can be of a radius of 0.1250 inches. Each of grooves 18 and 20 would be of a radius of 0.1252 inches, slightly larger, and if the two grooves are placed in confronting contacting relationship defines a cylindrical aperture having a diameter of 0.2504 inches. This permits the pin to fit within the groove with a light press fit. However, since the shaft has some clearance within the central opening 22, with the shaft rotated so that groove 18 is located at the top for assembly to the rotor, groove 18 does not contact the complementary groove in the rotor, but is slightly displaced therefrom. In the example given that spacing amounts to 0.0004 inches. And because the shaft has clearance spacing to the hole 22 in the rotor, the aperture departs slightly from a true cylindrical shape during this assembly.

Figure 4:
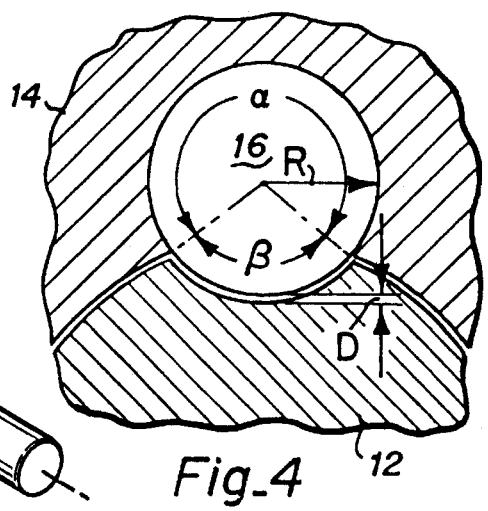
FIG. 4 is an exaggerated view of a section of FIG. 1 that assists in explaining an aspect of the invention.

As illustrated in the partial section view of pin 16 presented in FIG. 4, drawn to enlarged scale and exaggerated for better understanding, since the groove in rotor 14 subtends an arc, alpha, that is greater than 180 degrees, while the complementary groove in shaft 12 subtends an arc, Beta, of less than 180 degrees, the sides of groove 20 captures and lifts pin 16 off the bottom of groove 18 by a distance D, essentially equal to the clearance tolerance of the shaft groove. As a consequence of that clearance the frictional force produced by contact between the different materials is absent and the rotor may be moved along the shaft axis or "float". As a further consequence of that floating, and of the clearance difference between the shaft and rotor, the rotor is also permitted to slip slightly or have a slight amount of "play" in the rotational direction.

Although the foregoing described the mounting of a single rotor on a shaft, it is appreciated that multiple rotors may be so mounted to a single shaft and that other conventional couplings may also be incorporated to mount other gears on the same shaft.

Figure 5:
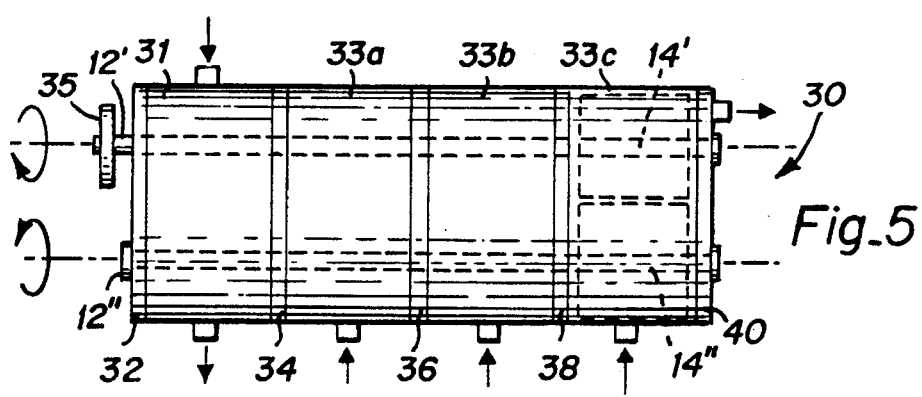
FIG. 5 symbolically illustrates an oil pump system that incorporates the present invention.

Reference is next made to FIG. 5 which illustrates pictorially an assembled oil pump system 30, which is of the Cosworth type with which the present coupling is employed. The system contains a principal oil pump 31, responsible for pumping oil from the oil sump to the engine as represented by the in and out directional arrows and three scavenger pumps 33a, 33b and 33c, of identical structure, that are arranged in line in a single assembly package.

A pair of shafts 12' and 12" supported by bearings, extend through the assembly and are connected to the respective pump gears and rotors, only two of which, Roots type rotors 14' and 14" in scavenger pump 33c being illustrated The respective rotors are bordered on each side by compartment walls 32, 34, 36, 38 and 40, some of which are common to two pump sections, defining the ends of the respective pump section. A pulley 35, that is driven by an engine or other prime mover, not illustrated, directly drives shaft 12' which turns the pump gears connected to the shaft and drives those gears attached to the second shaft 12", thereby indirectly driving the second shaft as well. Each of the scavenger pumps sucks oil from the engine compartment, as indicated by the in arrows, and pumps it out in common to the sump or other part of the system as indicated by the out arrow.

Such an oil pump assembly in practice is compact, easy to handle and desirably light in weight. To maintain that compactness, the relatively flat sides of the Roots type rotors in each pump compartment are positioned as close as possible to compartment walls so as not to detract from the pumping action and to maintain the size of the overall structure as small as practically feasible. The rotors are formed to a high tolerance by use of conventional electrical discharge machining equipment and, hence, is a relatively expensive component to produce.

In setting the dimensions for the coupling design the preferred approach is to first select a standard size pin that may be obtained in quantity from those concerns who consistently manufacture pins to correct tolerance levels of diameter, length and chamfer. With that the appropriate dimensions for the grooves in the more expensive components, such as the rotor, more easily follow.

Figure 6:
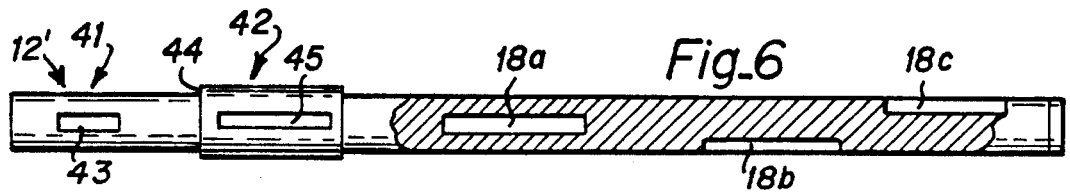
FIG. 6 is top section view of an oil pump shaft that incorporates the present invention.

Turning next to FIG. 6, a practical embodiment of shaft 12' for the foregoing oil pump is shown in a top partial section view drawn to a reduced scale and in which the section lines have been omitted for clarity. A first driven area 41 is located at one end of the shaft in which a conventional key slot 43 is positioned. Adjacent to the first driven area is a second driven area 42 which may include a collar 44 of greater diameter in which a second key slot 45 is placed.

The first and second key slots 43, 45 are conventional rectangular slots into which conventional square keys may be placed for a tight, non-slip coupling to a gear or pulley, such as represented in FIG. 5, but not illustrated in this figure. Gears or pulleys may be used to drive the input shaft. Gears may also be used to couple the shaft to other shafts which may be equipped with meshing rotors to make up a pumping combination of the Roots type which utilizes rotating meshing rotors for the pumping action.

The shaft is provided with three driving grooves 18a, 18b and 18c, defined by cylindrical walls as described in the preceding figures, one for each of the scavenger pumps. The grooves are spaced from one another axially on the shaft, and are distributed about the shaft, suitably angularly equidistant. Because the grooves are equiangularly spaced around the circumference of the shaft, the shaft is sectioned such that the additional grooves may be illustrated in the single figure for convenience.

The choice of three grooves is recognized as a design option. Fewer or greater number of grooves could be supplied, depending upon the number and type of elements to be driven by the shaft. If an embodiment was selected that only used two pumps, for example, a fewer number of grooves, placed differently might be employed.

In use, roots type rotors are each fitted to the shaft using the same technique earlier described with each Roots rotor overlying and being coupled to a respective one of the grooves, 18a, 18b, and 18c. Since the rotors each capture an associated coupling pin, and those pins are slightly raised from the bottom of the associated shaft groove some limited rotational play of the shaft is possible. The pump represented in FIG. 5 contains another like shaft with Roots rotors similarly arranged so that they mesh with those on the described shaft. Since the oil pump starts with cooled oil that elevates to a high temperature during operation, the shaft play permits the aluminum rotors to expand slightly at that operating temperature, an incidental advantage to the invention.

The key and slot of the present invention do not contain sharp corners like the familiar rectangular key in common use; they have smooth curved surfaces, specifically a cylindrical surface. Where the rectangular steel key would ultimately create large stress at the corner juncture with the aluminum rotor and eventually cause failure of the rotor, the curved key of the invention does not do so. With the invention, the driving forces on the pin are distributed over a greater surface area.

While the foregoing structure permits the rotor to float on the shaft, an ancillary consequence is that some advantageous rotational play is introduced, allowing the rotor to rotate very slightly relative to the shaft. In the modern high speed fluid pumping applications described, that contain aluminum pump rotors that must mesh for efficiency, some play between the rotors is desirable to account for minor misalignments or dimensional variations as between such cooperating rotors, and this play can provide leeway to account for thermal expansion of the meshed rotors as the pumps temperature is raised to normal operational levels.

Although the foregoing invention has been addressed with respect to and has its best advantage in automobile pump application in which the rotor is formed of material different than and less dense than the material of the shaft, as those skilled in the art appreciate, the invention has obvious advantage in other applications as well. While the foregoing specific embodiment incorporates unequal sized grooves, in other applications it may be found acceptable to employ grooves of equal size that may not have all of the advantages described for the embodiment presented. And while the pin in the described embodiment was cylindrical in shape, other geometries that avoid sharp key corners, such as an elliptical shape, may serve in other less demanding applications.

It is believed that the foregoing description of the preferred embodiments of the invention is sufficient in detail to enable one skilled in the art to make and use the invention. However, it is expressly understood that the detail of the elements presented for the foregoing purposes is not intended to limit the scope of the invention, in as much as equivalents to those elements and other modifications thereof, all of which come within the scope of the invention, will become apparent to those skilled in the art upon reading this specification. Thus the invention is to be broadly construed within the full scope of the appended claims.

What is claimed is:

1. In a dry sump oil pump of the type containing a rotatable shaft for driving a pump rotor, said rotor containing a passage for receiving said shaft, and coupling means for linking said shaft to said pump rotor for joint rotational movement, the improvement therein wherein said coupling means comprises:

a cylindrical pin;

a first cylindrical groove formed in the outer surface of said shaft and extending parallel to the axis of said shaft;

a second cylindrical groove formed in said rotor opening into said passage and extending parallel to the axis of said shaft;

said first and second cylindrical grooves being aligned to define a passage of a size that substantially conforms to said pin for receiving said pin in mating engagement;

said pin being disposed in said passage with said pin having a portion disposed in said first groove and a complementary portion of said pin being disposed in said second groove to bridge any gap between said shaft and said rotor; and wherein said first groove is of a first depth and said second groove is of a second depth and wherein said second depth is greater than said first depth, and wherein said first groove subtends an arc of less than 180 degrees and said second groove subtends an arc of greater than 180 degrees, whereby said complementary portion of said pin that is disposed in said second groove is greater than said portion that is disposed in said first groove and whereby said second groove essentially captures said pin and holds said pin within said first groove in a position spaced slightly above a bottom to said first groove;

wherein said cylindrical pin portion is received within said first groove with a clearance fit to said first groove and said complementary cylindrical pin portion is received within said second groove with a light press fit said second groove; and wherein said rotor is formed of a first metal material having a first thermal coefficient of expansion characteristic, and said shaft and pin is formed of a second metal material having a lower thermal coefficient of expansion characteristic than said first metal material.

2. The invention as defined in claim 1 wherein said first cylindrical groove is of a length greater than the length of said pin for permitting slight axial positioning of said pin on said shaft.

3. The invention as defined in claim 2 wherein said second groove is of a length at least as great as the length of said pin and extends through said rotor.

4. The invention as defined in claim 1 wherein said pin is of a first radius, r1; wherein said second groove is of a radius, r2, and said first groove is of a radius, (r2+Δ), said Δ being a slight increment in value, and where each of r2 and (r2+Δ) are slightly larger than r1.

5. In apparatus containing a rotatable shaft, a driven member mounted upon and rotated by said shaft, said driven member including a passage for receiving said shaft, and coupling means for coupling said driven member to said shaft for rotation by said shaft, the combination wherein said coupling means comprises:

an elongate pin having a smoothly curved outer surface and a cylindrical geometry and circular end faces;

a first groove formed in the outer surface of said shaft and extending parallel to the axis of said shaft;

a second groove formed in said driven member extending parallel to the axis of said shaft;

said first and second grooves being aligned to define an aperature for mating engagement with said pin, with said aperature extending along said axis of said shaft; and said pin being disposed in said aperature with a portion of said pin being disposed in said first groove and another portion of said pin being disposed in said second groove to bridge any gap between said shaft and said driven member, whereby any driving force exerted by said shaft to rotate said driven member is distributed along said outer surface of said pin; and wherein said second groove subtends a circular arc greater than one hundred and eighty degrees, whereby said second groove holds said pin; and wherein said driven member is formed of a first metal material having a first thermal coefficient of expansion characteristic, and said shaft and pin are formed of a second metal material having a lower thermal coefficient of expansion characteristic than said first metal material.

6. The method of coupling a driving shaft to a driven member by means of a cylindrical pin for joint rotational movement and permitting the driven member to float slightly along the axis of said shaft, said driven member including a shaft receiving passage therethrough and being formed of a material having a greater coefficient of thermal expansion than the material of said shaft and said cylindrical pin, comprising the steps of:

supporting said driven member on said shaft through said driven member's shaft receiving opening and inserting said cylindrical pin within a cylindrical groove located in the outer surface of said shaft and extending axially along a portion of the length thereof, the length of said cylindrical groove being slightly larger than the length of said cylindrical pin and the depth of said groove being substantially less than the diameter of said pin, whereby said groove subtends an arc of less than 180 degrees and a major portion of said pin protrudes above the outer surface of said shaft;

moving said driven member along said shaft axially until an initial portion of the length of said cylindrical pin is received within an axially extending cylindrical groove in said driven member that borders said shaft receiving opening and sufficient frictional resistance is encountered that prevents further movement of said driven member;

applying heat to said driven member to elevate the temperature of said driven member; and while the temperature of said driven member is elevated, further axially moving said driven member along said shaft to slightly lift said cylindrical pin off the bottom of said cylindrical groove in said outer surface of said shaft until said pin is fully received within said axially extending groove of said driven member.

* * * * *